Oct. 28, 1924.
C. P. CLARK
1,513,372
TESTING DEVICE
Filed Nov. 2, 1923
2 Sheets-Sheet 1
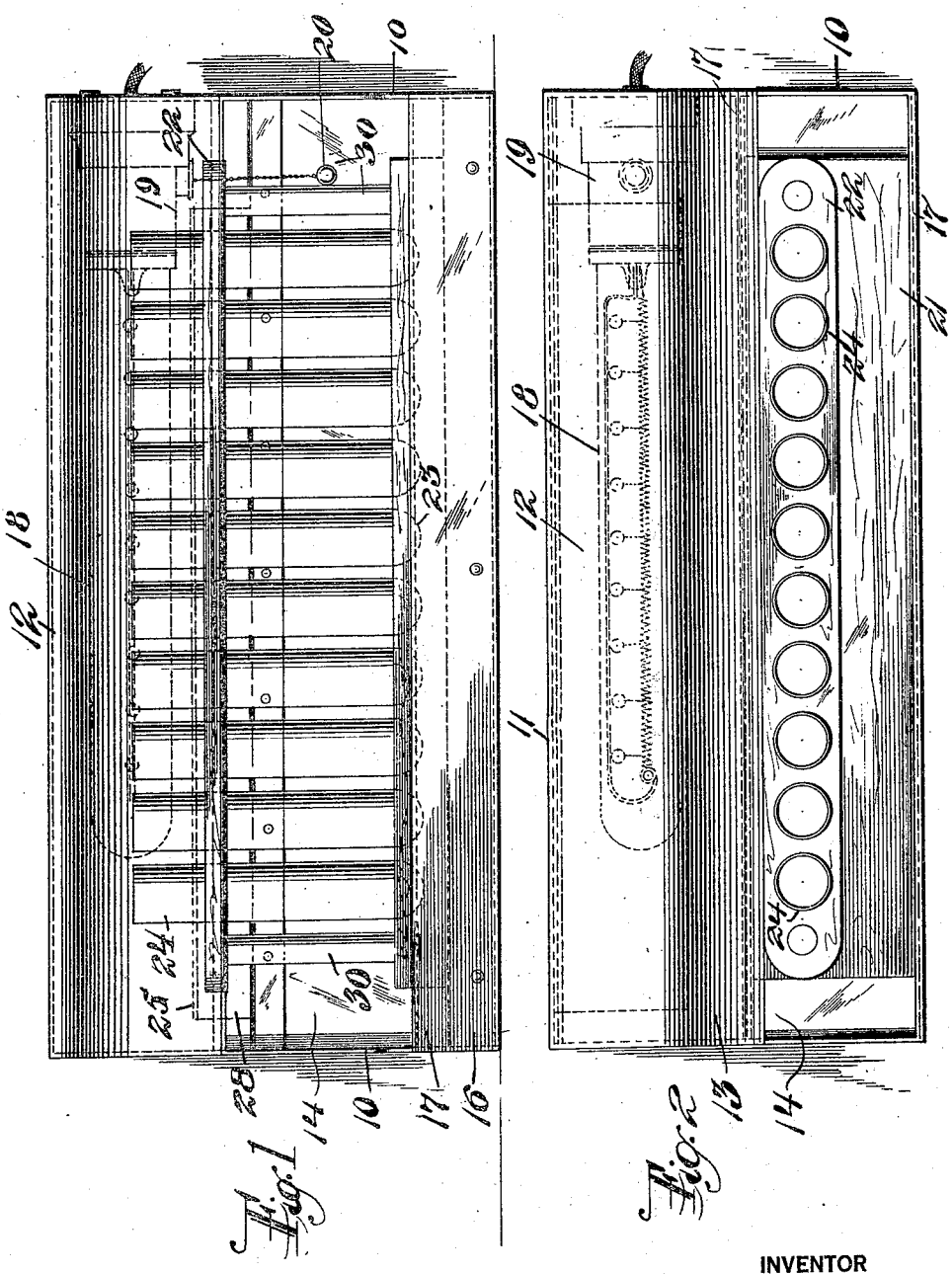
INVENTOR
Charles P. Clark,
BY
Wm. H. Caufield.
ATTORNEY

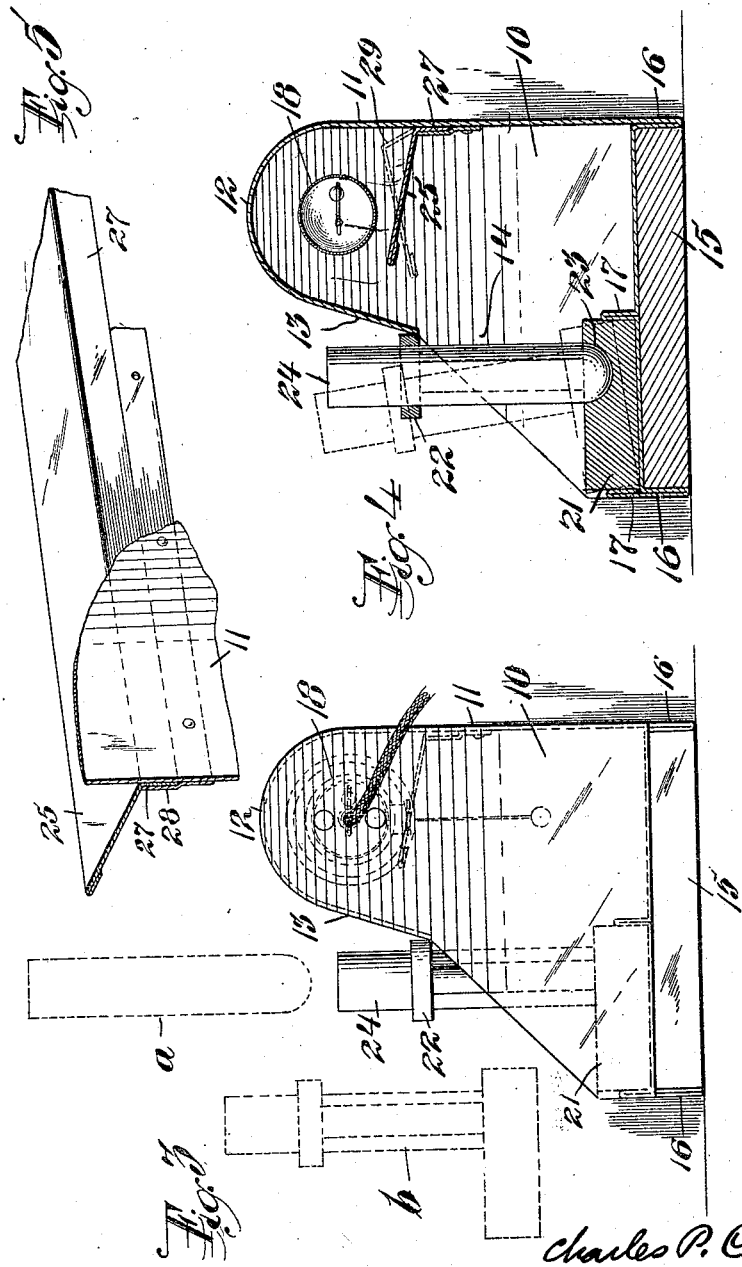

Patented Oct. 28, 1924.

1,513,372

UNITED STATES PATENT OFFICE.

CHARLES PATTON CLARK, OF SUMMIT, NEW JERSEY.

TESTING DEVICE.

Application filed November 2, 1923. Serial No. 672,251.

*To all whom it may concern:*

Be it known that I, CHARLES PATTON CLARK, a citizen of the United States, and a resident of Summit, county of Union, and State of New Jersey, have invented certain new and useful Improvements in Testing Devices, of which the following is a specification.

This invention relates to an improved testing device to facilitate, and also to assure accurate testing, of materials in solution or in suspension, usually contained in test tubes. In laboratory work, the detection and estimation of substances held in suspension is often difficult and inaccurate by reason of the fact that either the suspensoid is insufficiently illuminated, or is not examined against a background of a contrasting color. For example, the common tests for albumin in the urine are dependent upon the precipitation by heat or by chemicals of the contained proteid which precipitate is observed as a milky cloud or a white layer and which can best be detected when directly illuminated and viewed against a black background. Unless excellent facilities are at hand, faint traces are overlooked and comparison of precipitates in different tubes is often difficult. When daylight is depended upon the illumination is often faulty, varying with the position of the sun, or atmospheric conditions (clouds, fog, etc.).

The advantages claimed for the devised instrument are that it offers (*a*) artificial illumination of a uniform strength, (*b*) a uniform angle of illumination and (*c*) a uniform background. The instrument is equipped with a removable test tube rack, enabling the technician, or his assistant to prepare series of tests for observation.

In the accompanying drawings, I show a device embodying my invention, in which drawings Figure 1 is a front view and Figure 2 is a top view of a form of testing device and Figure 3 is an end view thereof. Figure 4 is a vertical section and Figure 5 is a detail sectional perspective view of the casing and a shield mounted therein.

In the construction shown, the casing is made of sheet metal and comprises end pieces 10, a back 11 which extends over the top as at 12 and extends downwardly in the form of an apron 13, leaving the opening 14 below the apron. The base 15 usually of wood extends forward beyond or in front of the bottom edge of the apron 13 and also provides a block over which the bottom edges of the sheet metal casing are doubled as at 16 and formed with flanged parts 17 which form a shallow receptacle for the rack which will be hereinafter described.

In the top of the casing is a light which is shown at 18 and in the form of a device illustrated where a series of batteries or tubes are inserted simultaneously the light 18 is of the long type extending the major portion of the length of the casing being supported in the socket 19 with the usual operating device such as the pull-chain 20.

The rack for holding the test tubes is formed with a block 21, an upper strip 22, the strip 22 having openings aligned with the recesses 23 in the base 21 in order to hold the test tubes 24 which contain the material to be tested. This permits of the test tubes being inserted as shown at *a* in Figure 3 or the whole rack can be removed as shown at *b* in Figure 3.

The shield 25 is arranged longitudinally in the casing below the light and while it permits the light to shed direct rays on the test tubes, it prevents the direct rays of light from illuminating the background, that is the inner walls of the chamber 26 which walls are usually coated with a material that has a dull finish and usually black particularly with light colored substances to be tested for.

In order to permit the removal of the light 18, either for replacement or cleaning, I make the shield 25, removable, the preferred form being shown in Figures 4 and 5, the flange 27 of the shield 25, fitting into the groove formed against the back 11 by the off-set strip 28. In dotted outline I illustrate at 29 in Figure 4, a position of the shield when partly removed.

The rack is usually disposed so that the upper strip 22 rests against the front of the bottom edge of the apron 13 and being supported from the base 21 by the posts 30, it still further acts as a shield to keep from the eye of the observer looking obliquely downward at the test tubes, any rays except those that come through the tubes.

It will be evident that modifications may be made in the structure without departing from the scope of the invention.

I claim:

1. A testing device comprising a casing with its front open at the lower portion, a light in the upper portion a test tube holder in the opening in the front and a shield to keep light rays from striking the casing behind the test tube holder so that test tubes in the holder are provided with a background that is not illuminated.

2. A testing device comprising a casing with its front open at the lower portion, a light in the upper portion a test tube holder in the opening in the front and a shield to keep light rays from striking the casing behind the test tube holder, the inside of the casing in rear of the holder being colored to contrast with the material in suspension in the test tubes in the holder.

3. A testing device comprising a casing with an apron at the front below which is an opening, a means for holding a test tube in the opening, a light in the casing, and a removable shield disposed so as to keep light rays from striking the casing behind the test tube so that test tubes in the holder are provided with a background that is not illuminated.

4. A testing device comprising a casing having an apron at the front below which is an opening the base of the casing extending forward of the bottom of the apron, a holder for test tubes removably fitting on the base and in front of the apron whereby the tubes are held in the opening, a light in the top part of the casing to illuminate the tubes and a shield to keep direct rays of the light from striking the casing behind the tubes so that test tubes in the holder are provided with a background that is not illuminated.

5. A testing device comprising a casing having an apron at the front below which is an opening the base of the casing extending forward of the bottom of the apron, a holder for test tubes removably fitting on the base and in front of the apron whereby the tubes are held in the opening, a light in the top part of the casing to illuminate the tubes and a shield to keep direct rays of the light from striking the casing behind the tubes, that part of the casing behind the tubes having a color to contrast with material in suspension or in solution in the tubes.

In testimony that I claim the foregoing, I have hereto set my hand, this 4th day of October, 1923.

CHARLES PATTON CLARK.